Sept. 26, 1939.  P. M. PATTERSON  2,174,010
COUPLING DEVICE
Filed Feb. 19, 1938

INVENTOR
PHILIP M. PATTERSON
BY Robert B Terry
ATTORNEY

Patented Sept. 26, 1939

2,174,010

UNITED STATES PATENT OFFICE 2,174,010

COUPLING DEVICE

Philip M. Patterson, West Roxbury, Mass., assignor to The Torrington Mfg. Co., Torrington, Conn., a corporation of Connecticut Application February 19, 1938, Serial No. 191,418

6 Claims. (Cl. 64—11)

This invention relates to an improved coupling device for rotative members such as a pair of shafts, and has particular reference to a flexible type of coupling adapted for use in oil burner assemblies of the type employing an air impeller or blower and an oil supply pump both driven by a single electric motor, wherein the assembly arrangement of these parts is such that the blower is directly driven from the motor while the pump is driven therefrom through suitable coupling means.

An object of the invention is found in the provision of an improved, simplified coupling device providing a positive operative connection between rotary members, the coupling being of a flexible type to accommodate a slight axial misalignment of the members to be connected.

Among other objects may be noted the provision of an improved coupling device of flexible type, comprised of few parts assembled in a novel manner, the design of the several parts and their assembly being such as to facilitate manufacture of the coupling, and at the same time to provide an effective coupler device for operatively connecting rotary elements; the provision of a coupling for operatively connecting rotary elements of a burner assembly adapted for direct connection at one end, to the shaft of the pump rotor, and at its other end to the hub of the air impeller, the manner of effecting such connections being designed to facilitate a ready and easy application of the coupling to the rotary elements, as well as ready removal thereof for repair or replacement purposes, and the provision of a coupling of flexible type to care for axial misalignment of the members to be connected, the flexible nature of the coupling serving in addition, to provide a definite angular and torsional resilience, so as to cushion against any shock on the motor in starting the pump.

Yet another object of the invention is attained in a combination of a coupling member of the type described, with a fan and pump or the like, driven thereby, the structure of the coupling being such that when operating in an air current induced or produced by the fan or blower, it will present a smooth, rounded exterior, producing a minimum disturbance of and turbulence in the air stream.

Figure 1:
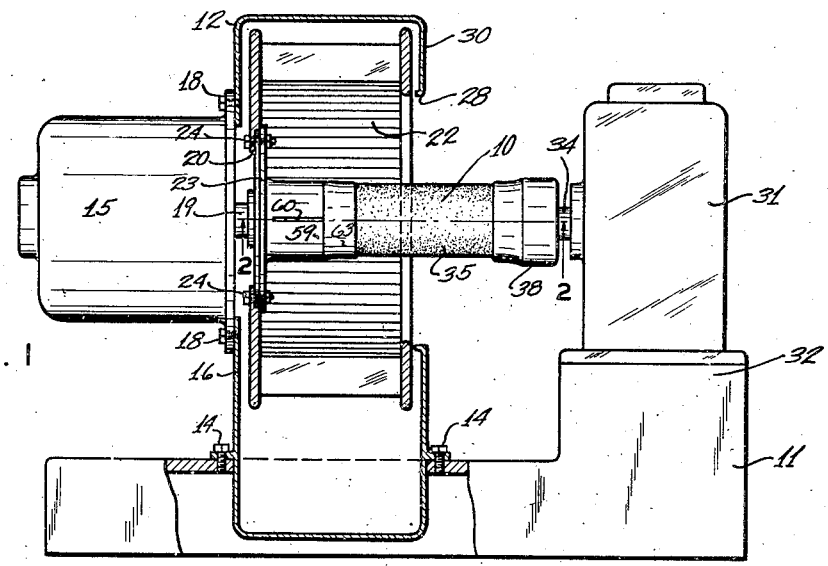
Figure 2:
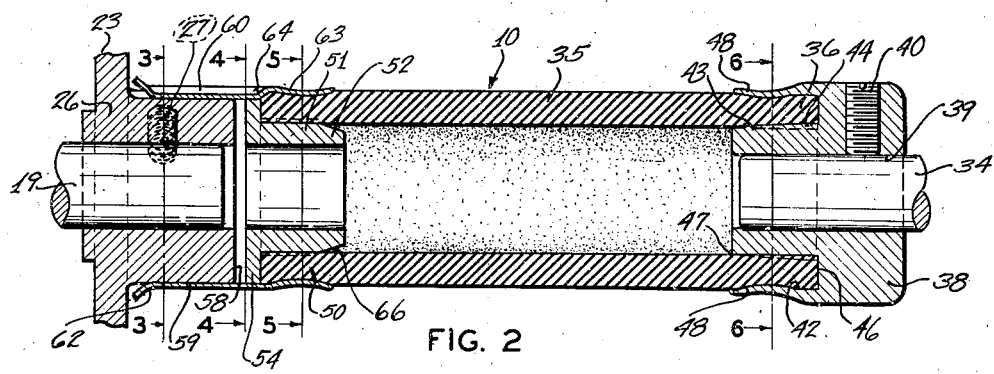

Other objects and advantages will readily appear from the following description of the coupling selected for disclosure, as considered in connection with the accompanying drawing, in which:

Fig. 1 illustrates in side elevation, an oil burner assembly incorporating the improved coupling device, the air impeller being shown in section in order to disclose the coupling in operative connection to the impeller hub; Fig. 2 is a longitudinal section of the coupling, shown as applied to the shaft of the pump rotor and to the impeller hub taken on line 2—2 of Fig. 1, and Figs. 3, 4, 5 and 6 are each transverse sections of the coupling assembly, as viewed respectively from lines 3—3, 4—4, 5—5 and 6—6 in Fig. 2.

Referring to the drawing by suitable reference characters, the improved coupling device denoted generally by the numeral 10, is illustrated in Fig. 1 as applied to an oil burner assembly of a prevailing so-called gun type. The embodiment of the coupling in an oil burner is submitted as a preferred example of its application, particularly since the coupling is advantageously designed for use with such mechanism, as will appear hereinafter.

The burner comprises a supporting frame 11 of suitable form, on which is mounted an air impeller or blower casing 12 secured thereto as by bolts 14. The casing which may be of volute form, and supports an electric motor 15, the motor being secured to a side wall 16 of the casing as by bolts 18, and having its rotor shaft 19 extending part way into the casing through an opening 20 provided in the wall 16. Operatively supported on the motor shaft, and within the casing 12 is an air impeller or fan which may be of any of the well known types of centrifugal blower wheel. The fan illustrated comprises a cage-like blade structure 22 secured to a disc 23 as by bolts 24, the disc being provided with an extended hub 26 which is seated on the motor shaft 19, and secured thereto by a suitable set screw indicated in broken lines at 27. An air inlet to the fan is provided by an opening 28 in the casing wall 30 opposite wall 16, this opening being located so as to provide an axial air inlet to the fan. From the foregoing, it will be observed that the mounting of the motor on the blower casing and the operative support of the fan on the motor shaft provides a compact and simplified assembly of these parts, as well as attaining a direct fan drive from the motor.

The motor 15 serving to drive the blower or fan, may be utilized also to operate a fuel supply pump forming an element of the burner assembly, such a pump being shown at 31 (Fig. 1) mounted on a raised portion 32 of frame 11. The pump which is preferably located substantially adjacent the blower casing 12 in order to minimize the length of the coupling connection required between the pump and motor, has its rotor shaft 34 extended toward but spaced from the motor shaft 19 and in substantial axial alignment therewith. The pump shaft is operatively connected to the motor shaft, preferably through the fan hub 26, by the coupling device 10 embodying the features provided by the invention, as will be now described.

The coupling comprises a relatively short tubular element 35 of a resilient or flexible construction. As an example, the element may consist of a section of a known type of multi-ply tube stock or hose, formed of cured rubber stock and woven fabric or fibre material, and by preference of a size having an internal diameter somewhat in excess of the diameter of each of the shafts to be coupled. In the selection of a rubberized fabric section of tube stock to be utilized as a coupling element, it will be readily appreciated that the sectional area of the hose wall must be at least sufficient to transmit effectively the rotative driving force of the motor to the pump rotor, under the maximum requirements of operating conditions. Moreover, it is desirable that the flexibility characteristic of the hose element selected be such as to permit a slight but perceptible torsional or angular displacement of the element between its ends, particularly when the motor starts the pump in operation, as this will serve to cushion any shock on the motor incident to picking up and accelerating the dead load provided by the pump, as will be readily understood. Also, the flexibility of the element will permit coupling application thereof to shaft elements which may be in slight axial misalignment, thereby rendering unnecessary any exacting provision in effecting a true axial alignment of the shafts, as for example, the pump shaft with the motor shaft in the burner assembly illustrated.

Figure 4:
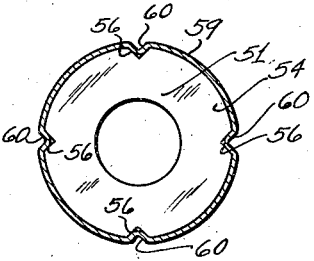
Figure 5:
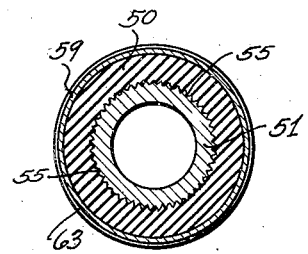
Figure 6:
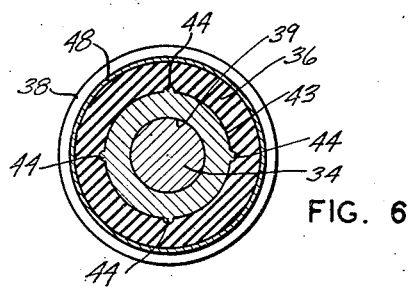

The structural assembly of the coupling device and its application to the pump shaft and the fan hub are shown in detail by Figs. 2 through 6. One end 36 of the flexible element 35 above described, is firmly connected to a shaft engaging member or collar 38, the collar being provided with an axial bore 39 for the reception of a shaft end, such as the pump shaft 34, a set screw 40 in the collar serving to effect an operative connection between the collar and shaft. The collar, which may be and by preference is a die-cast metal element, is formed to provide an annular pocket or recess 42 in one end, for the reception of the annular end portion 36 of flexible element 35. To prevent turning of the end 36 in the recess, the inner wall 43 of the recess has formed thereon preferably in the casting process, peripherally spaced projections or ridges 44 (Figs. 2 and 6), extending longitudinally of the recess. These are tapered from the bottom 46 of the recess toward the open end 47 thereof, merging by preference, with the surface of the inner recess wall 43 adjacent the end 47, in the manner shown by Fig. 2. As a result, when the annular end 36 of element 35 is inserted in the recess, the projections depress the inner surface portions of the element engaged thereby, as shown in Fig. 6, whereby the end 36 is effectively precluded from turning relative to the collar 38. The outward taper of the projections serves to facilitate insertion of the end 36 in the recess 42, in the assembly process.

In die-casting the collar 38, it is preferred that the outer wall portion 48 thereof, defining the recess 42, be outwardly tapered, to facilitate assembly of the collar to the flexible element 35. Although the tapered outer wall is not shown as it appears in the collar before assembly thereof to the flexible element 35, such is indicated by the section of this wall shown in Fig. 2 as decreasing from the bottom of the recess toward the outer end thereof. After the end 36 of element 35 is inserted in the recess, the outer wall 48 is deformed inwardly against the end portion 36 as shown in Fig. 2, this being accomplished in any well known manner. In this manner the element 35 and collar 38 are firmly assembled; the deformed wall 48 and the projections 44 serving to compress the end portion 36 in the recess 42 so as frictionally to grip the same, whereby to provide a positive connection between the flexible element and the collar, turning of the element end 36 in the recess being prevented as heretofore noted, by the projections 44.

Turning now to the operative connection of the opposite end 50, which for present illustration may be considered as the driving end of flexible element 35, to the motor shaft 19 through the fan hub 26, there is provided an annular member 51 beveled at one end 52 and formed with an annular radially extending flange 54 at the opposite end thereof. The diameter of the flange is by preference, substantially equal to that of the fan hub 26, for a purpose presently appearing. The surface of the member 51 is longitudinally serrated or toothed, as shown at 55 in Figs. 2 and 5, while the periphery of the flange is provided with spaced, substantially V-shaped notches 56 (Fig. 4), the teeth and notches serving a purpose later appearing. The member 51 may be and is by preference a die-casting of a suitable material, which may be similar to that utilized in the casting of the collar 38.

Figure 3:
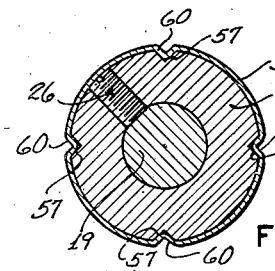

As shown by Figs. 2 and 3, the fan hub 26 is provided with longitudinally extending notches 57 similar in number, shape and angular spacing to those in the flange of member 51, the notches being open at the end 58 of the hub, as indicated in Fig. 2. The hub notches serve to transmit the rotary movement of the hub to the flexible element 35 through the member 51 and a sleeve element 59 in a preferred manner now to be described. The sleeve 59, which may be of brass tubing stock or other suitable material, is formed to provide substantially V-shape depressions 60 equal in number and angular spacing to the notches in the flange of element 51, and those in the fan hub. The depressions extend longitudinally of the sleeve from the end 62 thereof, terminating inwardly of the opposite end portion 63, as at 64. As shown by Fig. 2, the sleeve end 62 is outwardly flared to facilitate seating of the sleeve on the fan hub 26. In the assembled relation of these parts, the element 51 is seated in the sleeve with its notches 56 engaged by the sleeve depressions 60 substantially at the terminals 64 thereof (Figs. 2 and 4). In such position, the sleeve end portion 63 overlies in radially spaced relation, the toothed surface of the element 51, forming therewith and with the flange 54 an annular recess or pocket 66 for the reception of the end portion 50 of flexible member 35. In order to effect a positive driving connection between the sleeve, element 51 and the end 50 of member 35 when seated in the pocket 66, the end 63 of the sleeve is deformed or rolled inwardly to compress the end 50 in the recess. As a result, the teeth 55 on member 51 frictionally engage and depress about the teeth, inner surface portions of the end 50 (Fig. 5). In this manner, the sleeve 59 and member 51 cooperate in frictionally gripping the end 50 of flexible element 35. It is to be noted that the teeth 55 serve effectively to prevent turning of the end 50 in the recess or relative to the member 51 and sleeve 59.

The remainder of the sleeve 59 is seated over the fan hub 26, with its depressions 60 in the hub notches 57 (Fig. 3), the length of the sleeve and that of the hub preferably being such that the flared end of the sleeve lies substantially adjacent the inner end of the hub when the element 51 is substantially adjacent the end 58 of the hub, as shown by Fig. 2. There is thus provided a positive and compact drive connection between the fan hub and the end 50 of flexible element 35, the driving force being transmitted through the sleeve depressions 60 seated in the hub notches 57 and those in the flange of member 51.

It is preferred in the present example, and as shown in Figs. 2 and 3, to position the set screw 27 so that the sleeve in assembly thereon, overlies the set screw head. Accordingly, the length of the set screw utilized must be such that its head portion lies at least flush with the peripheral surface of the hub or preferably inwardly thereof, when the screw is in shaft engaging position, in order to preclude interference thereof with the application of the sleeve to the hub.

From the foregoing description of the coupling assembly, it will be observed that a flexible coupling is provided which may be used to advantage in an oil burner assembly, operatively to connect the pump shaft to the motor through the fan hub, by means of an elongate, slidable, quick-detachable connection. In practice, the coupling is formed as a unitary structure comprised of the flexible tubular element 35, the collar 38, member 51 and sleeve 59, these parts being pre-assembled in the manner above described, with the sleeve end portion 62 projecting longitudinally beyond the end 50 of the tubular member. The pre-assembled coupling then may be applied as a unit to the rotative elements of the burner assembly, as by longitudinally sliding the sleeve end 62 over the fan hub 26 with the sleeve depressions 60 seated in the hub notches 57. Likewise on the other, say the driven end of the coupling, the collar 38 is sleeved on the pump shaft 34 and the set screw 40 turned inwardly to provide the desired operative connection of the collar to the shaft. It will be noted that the arrangement lends itself to ready assembly to and removal from the fan or blower, and offers all of the advantages set forth in the foregoing objects. It will further be noted that the length of the sleeve portion 59 and hub 26 are such that, when utilizing the coupling unit described, the spacing of the pump and fan need not be accurately predetermined, as the coupling will care for a substantial variation in spacing of the driving and driven units.

While the foregoing description relates only to a preferred embodiment of my invention, nevertheless, it is to be understood that the parts thereof may be altered and the assembly thereof modified without departing from the spirit and full intended scope of the invention, as defined by the appended claims.

I claim:

1. A coupling for operatively connecting rotary members, comprising a tubular, resilient element, means in engagement with one end of said element and adapted for connecting said end to one of said rotary members, and a coupling head in gripping relation to the opposite end of said element, adapted for effecting an operative connection between said opposite end of the resilient element and the other of said rotary members, the coupling head consisting of a one-piece structure of relatively easily deformed metal, provided with an axially-opening annular recess occupied by and enclosing the adjacent end of the tubular element, the outer wall about the recess being deformed into compressive holding engagement with the last said end of the tubular element.

2. A coupling for operatively connecting rotary members, comprising a tubular flexible element, means gripping one end of said element and adapted for connecting said end to one of said rotary members, and members cooperating in frictionally gripping the opposite end of said element, one of the last said members consisting of a tubular sheet metal fitting extended longitudinally beyond the flexible element for operative connection to the other of said rotary members, the tubular sheet metal fitting being constricted about the adjacent end of the flexible element.

3. A coupling for connecting rotary members, comprising a flexible tubular element, means in gripping engagement with one end of said tubular element and adapted for operative connection to one of said rotary members, a member frictionally engaging the opposite end of said element internally thereof, and a sleeve having one of its ends operatively connected to said member externally of the tubular element, and having a splined portion axially beyond said element and member, for operative connection to the other of said rotary members, said sleeve having a portion thereof deformed into frictional engagement with said opposite end of the flexible element.

4. A coupling for connecting rotary members, comprising a flexible tubular element, means frictionally gripping one end of said element, adapted for operative connection to one of said rotary members, a member having a toothed portion frictionally engaging the opposite end of said element internally thereof, said member having a flanged portion provided with radially spaced notches in the periphery thereof, and a sleeve enclosing said member and provided with elements adapted to seat in said flange notches, a portion of said sleeve being deformed into frictional engagement with said opposite end of said flexible element and another portion of the sleeve being adapted for operative connection to the other of said rotary members.

5. As an article of manufacture, a coupling for operatively connecting rotary members such as a pair of shafts, the coupling comprising an angularly and axially flexible tubular element of non-metallic construction, a shaft-engaging member having an annular, axially concentric recess therein, in which one end of said flexible element is seated, a portion of the member defining said recess being deformed into engagement with said end of the tubular element so as to secure the end in the recess, and shaft engaging means frictionally gripping the opposite end of said flexible element, said means including a flanged member provided with a serrated portion in frictional engagement with said opposite end internally thereof, the flange of said member having radially spaced notches in the periphery thereof, and a sleeve enclosing said flanged member and provided with similarly spaced depressions adapted to seat in said notches, one end portion of said sleeve being deformed against the last said end of the flexible element, and cooperating with the serrated portion of said flanged member, in frictionally gripping the said opposite end of the flexible element.

6. A coupling for connecting rotary members, comprising a flexible tubular element, means secured to one end of said element, adapted for operative connection to one of said rotary members, a member having a toothed portion frictionally engaging the opposite end of said element internally thereof, said member having a flanged portion provided with radially spaced notches in the periphery thereof, and a sleeve enclosing said member and provided with elements adapted to seat in said flange notches, a portion of said sleeve being deformed into frictional engagement with said opposite end of said flexible element and another portion of the sleeve being adapted for operative connection to the other of said rotary members.

PHILIP M. PATTERSON.